(12) United States Patent
Hori

(10) Patent No.: US 9,304,250 B2
(45) Date of Patent: Apr. 5, 2016

(54) LIGHT EMITTING UNIT

(71) Applicant: YAZAKI CORPORATION, Tokyo (JP)

(72) Inventor: Takahiro Hori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/510,911

(22) Filed: Oct. 9, 2014

(65) Prior Publication Data
US 2015/0023047 A1    Jan. 22, 2015

Related U.S. Application Data

(63) Continuation of application No. PCT/JP2013/062678, filed on Apr. 23, 2013.

(30) Foreign Application Priority Data

May 9, 2012   (JP) .................................. 2012-107222

(51) Int. Cl.
| | |
|---|---|
| *F21V 8/00* | (2006.01) |
| *B60Q 3/00* | (2006.01) |
| *B60Q 3/04* | (2006.01) |
| *H01H 13/83* | (2006.01) |
| *G02B 6/28* | (2006.01) |

(52) U.S. Cl.
CPC .............. *G02B 6/0096* (2013.01); *B60Q 3/005* (2013.01); *B60Q 3/044* (2013.01); *G02B 6/0008* (2013.01); *H01H 13/83* (2013.01); *G02B 6/2817* (2013.01); *H01H 2219/062* (2013.01)

(58) Field of Classification Search
CPC .... G02B 6/0096; G02B 6/0008; B60Q 3/005; B60Q 3/044; H01H 13/83
See application file for complete search history.

(56) References Cited

U.S. PATENT DOCUMENTS

| | | | |
|---|---|---|---|
| 7,386,203 B2* | 6/2008 | Maitland ............. | G02B 6/0008 385/141 |
| 2002/0105793 A1 | 8/2002 | Oda et al. | |

(Continued)

FOREIGN PATENT DOCUMENTS

| | | |
|---|---|---|
| CN | 1702484 A | 11/2005 |
| EP | 1 339 080 A1 | 8/2003 |

(Continued)

OTHER PUBLICATIONS

German Office Action for the related German Patent Application No. 11 2013 002 398.9 dated Apr. 24, 2015.

(Continued)

*Primary Examiner* — Mary Ellen Bowman
(74) *Attorney, Agent, or Firm* — Kenealy Vaidya LLP (57) ABSTRACT

A light emitting unit includes a light source and a light guiding member. The light guiding member includes a light incident guiding portion that is arranged to face a light emitting surface of the light source and have a light incident surface, on which light emitted from the light source is incident, is formed at one end thereof, and a plurality of branched extending light guiding portions that are branched from the light incident guiding portion and extend towards back surfaces of a plurality of display portions. The plurality of branched extending light guiding portions are so formed that, the end surfaces of the branched extending light guiding portions have larger areas in accordance with increase of the lengths in the extending directions of the branched extending light guiding portions.

4 Claims, 8 Drawing Sheets

(56) References Cited

U.S. PATENT DOCUMENTS

| | | |
|---|---|---|
| 2003/0155225 A1 | 8/2003 | Kondo et al. |
| 2004/0246697 A1 | 12/2004 | Yamashita et al. |
| 2005/0265684 A1 | 12/2005 | Nemoto et al. |
| 2006/0165370 A1 | 7/2006 | Nemoto et al. |
| 2008/0232136 A1 | 9/2008 | Yamashita et al. |

FOREIGN PATENT DOCUMENTS

| | | |
|---|---|---|
| JP | 8-129935 A | 5/1996 |
| JP | 2004-199005 A | 7/2004 |
| JP | 2007-308102 A | 11/2007 |
| JP | 4119633 B2 | 7/2008 |
| WO | 2005/080861 A1 | 9/2005 |

OTHER PUBLICATIONS

International Search Report and Written Opinion of the International Search Report for PCT/JP2013/062678 dated Aug. 14, 2013.

Chinese Office Action for the related Chinese Patent Application No. 201380024206.1 dated Nov. 30, 2015.

* cited by examiner

LIGHT EMITTING UNIT

CROSS REFERENCE TO RELATED APPLICATIONS

This application is a continuation of PCT application No. PCT/JP2013/062678, which was filed on Apr. 23, 2013 based on Japanese Patent Application (No. P2012-107222) filed on May 9, 2012, the contents of which are incorporated herein by reference.

BACKGROUND OF THE INVENTION

1. Field of the Invention

The present disclosure relates to a light emitting unit which has a light source and a light guiding member which makes a plurality of display portions emit light with light emitted from the light source.

2. Description of the Related Art

Traditionally, in order to operate a device, the operability is improved by making display portions which display operation-related characters, figures or the like emit light. Lights emitted from light sources towards the back surfaces of such display portions make the display portions emit light. Therefore, when a plurality of display portions are made to emit light, a plurality of light sources are necessary. As a result, the cost of the device increases. Thus, it is important for the reduction of the cost of the device to control the number of the used light sources. For example, in JP-A-2007-308102, a light emitting unit which uses one light source to make a plurality of display portions emit light is proposed.

The light emitting unit described in JP-A-2007-308102 has a light source and a light guiding member. The light guiding member includes a columnar light incident portion (light incident guiding portion) and a plurality of light guiding portions (branched extending light guiding portions). The columnar light incident portion is arranged to face a light emitting surface of the light source. One end of the light incident portion is a light incident surface, which is an end surface on which light emitted from the light source is incident. The plurality of light guiding portions are branched from the light incident portion (light incident guiding portion) and extend towards the back surfaces of a plurality of display portions, and makes the display portions emit light when light incident from the light incident portion (light incident guiding portion) is transmitted from end surfaces of the plurality of light guiding portions (branched extending light guiding portions).

SUMMARY OF THE INVENTION

However, for the light emitting unit described in JP-A-2007-308102, when the distances between the light source and the display portions are different, the light reflected and guided inside the light guiding member is attenuated in proportion to the distances, and as a result, there is a problem that variations in brightness of the display portions occur.

The present disclosure is made in view of the above situations, and the object of the present disclosure is to provide a light emitting unit that can make a plurality of display portions emit light with uniform brightness while the number of light sources is reduced.

In order to achieve the above object, according to the present publication, there is provided a light emitting unit comprising:

a light source; and a light guiding member including:

a light incident guiding portion that is arranged to face a light emitting surface of the light source and have a light incident surface, on which light emitted from the light source is incident, is formed at one end thereof; and a plurality of branched extending light guiding portions that are branched from the light incident guiding portion and extend towards back surfaces of a plurality of display portions, wherein the light guiding member makes the display portions emit light when light incident from the light incident guiding portion is transmitted from end surfaces of the plurality of branched extending light guiding portions;

wherein a branched portion, which is branched into the plurality of branched extending light guiding portions, is provided at the other end of the light incident guiding portion which is opposite to the one end; and wherein the plurality of branched extending light guiding portions are so formed that, the end surfaces of the branched extending light guiding portions have larger areas in accordance with increase of the lengths in the extending directions of the branched extending light guiding portions.

For example, sections of the branched extending light guiding portions of the light guiding member perpendicular to the extending direction thereof are uniform in size from the branched portion to the end surfaces respectively.

For example, in the light guiding member, in a case that the lengths in the extending directions of the branched extending light guiding portions are relatively different, a section except the extension end perpendicular to the extending direction of a first branched extending light guiding portion is formed to be equal to a section perpendicular to the extending direction of a second branched extending light guiding portion which is longer than the first branched extending light guiding portion, and a part of the extension end of the first branched extending light guiding portion is cut off from a side of the extension end so that the area of the end surface is reduced.

For example, the plurality of branched extending light guiding portions have cylindrical shapes respectively.

In the light emitting unit according to the first aspect of the present disclosure, light emitted from one light source is guided to the plurality of display portions by the light guiding member, and in consideration of the difference between the attenuation amounts of the lights produced due to the lengths in the extending direction of the plurality of branched extending light guiding portions, the areas of the end surfaces are set so that the same amounts of lights are emitted from the end surfaces of the branched extending light guiding portions. Thus, while the number of the light sources is reduced, the plurality of display portions can be made to emit light with uniform brightness.

Because the outer peripheral surface of the extension end of the branched extending light guiding portion is perpendicular to the end surface in the light emitting unit according to the second aspect of the present disclosure, the light transmitted from the outer peripheral surface of the extension end can be prevented from affecting the brightness of the display portions.

In the light emitting unit according to the third aspect of the present disclosure, the size of the end surface can be easily reduced by cutting the extension end of the branched extending light guiding portion.

Because the plurality of branched extending light guiding portions in the light emitting unit according to the fourth aspect of the present disclosure are cylindrical, and the outer surfaces are axially symmetric, the connection arrangement of the branched extending light guiding portions at the branched portion is highly flexible. As a result, the plurality of branched extending light guiding portions can be easily branched at the branched portion.

DETAILED DESCRIPTION OF THE EXEMPLARY EMBODIMENTS

Preferred embodiments of the light emitting units according to the present disclosure will be described in detail with reference to the figures as follows.

Embodiment 1

Figure 1:
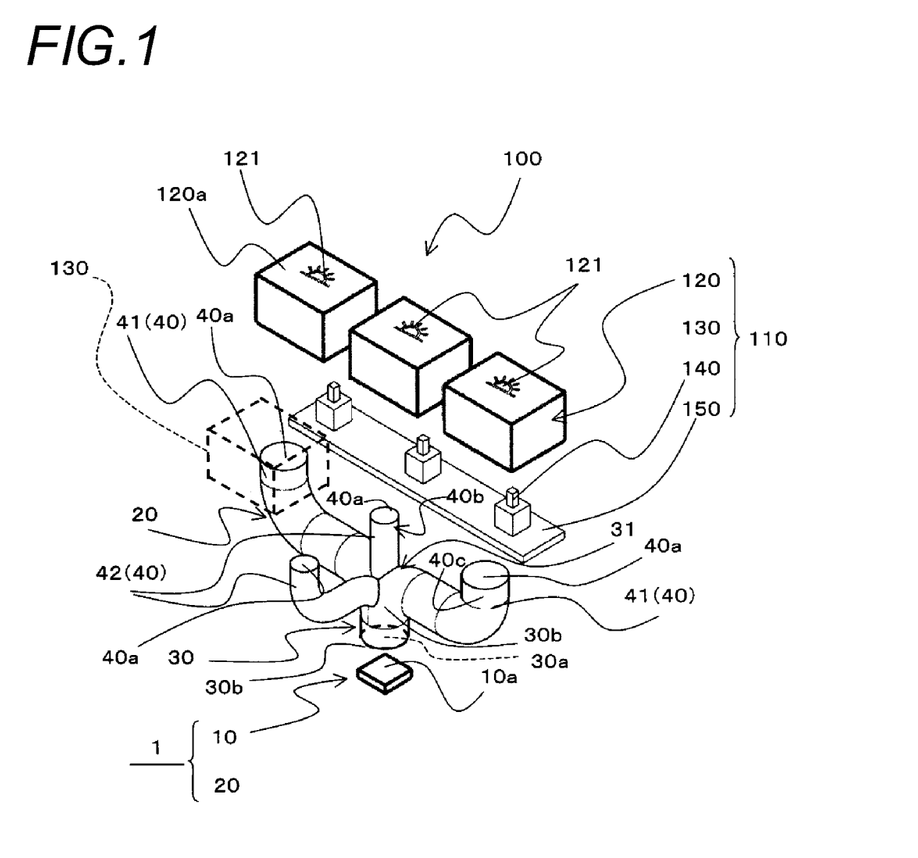
FIG. 1 is an exploded perspective view of a switch unit in which a light emitting unit according to an embodiment 1 of the present disclosure is incorporated.

FIG. 1 is an exploded perspective view of a switch unit 100 in which a light emitting unit 1 according to the embodiment 1 of the present disclosure is incorporated. In FIG. 1, a downlight display portion 130 is shown with dashed lines so that parts which interfere with the downlight display portion 130 are seen.

Figure 2:
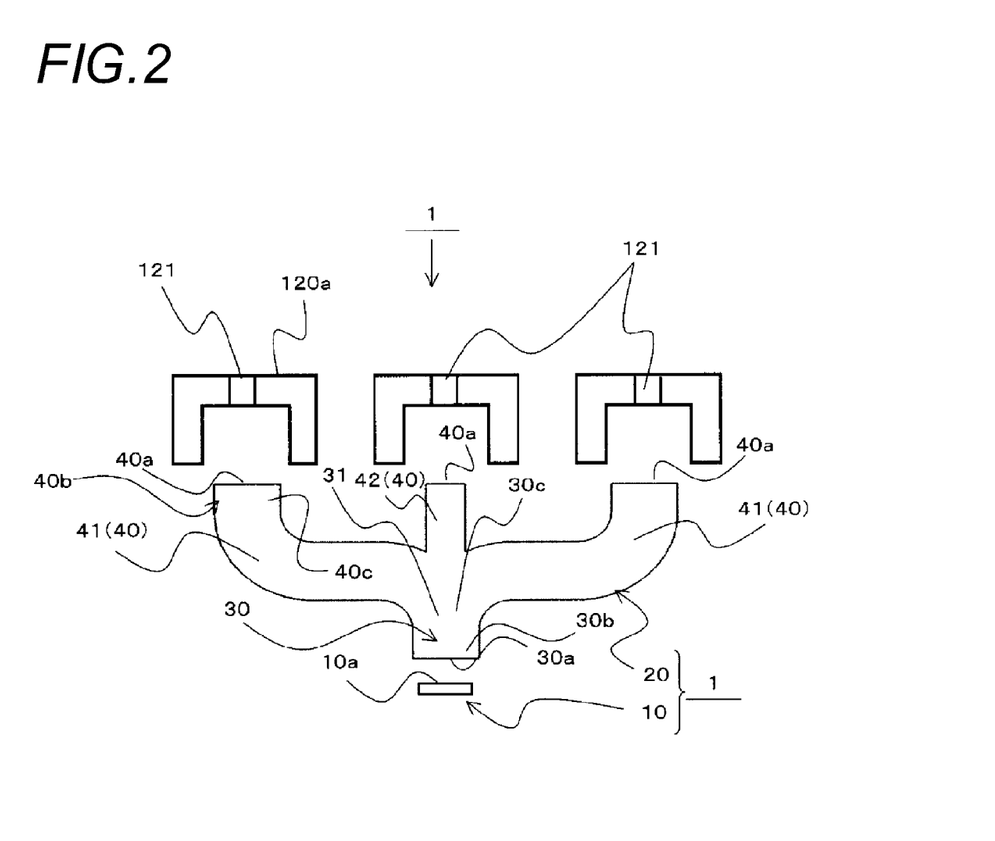
FIG. 2 is a sectional view of the switching unit shown in FIG. 1.

FIG. 2 is a sectional view of the switch unit 100 shown in FIG. 1. In FIG. 2, push switch portions 140 and a circuit board 150 are omitted (not shown).

Figure 3:
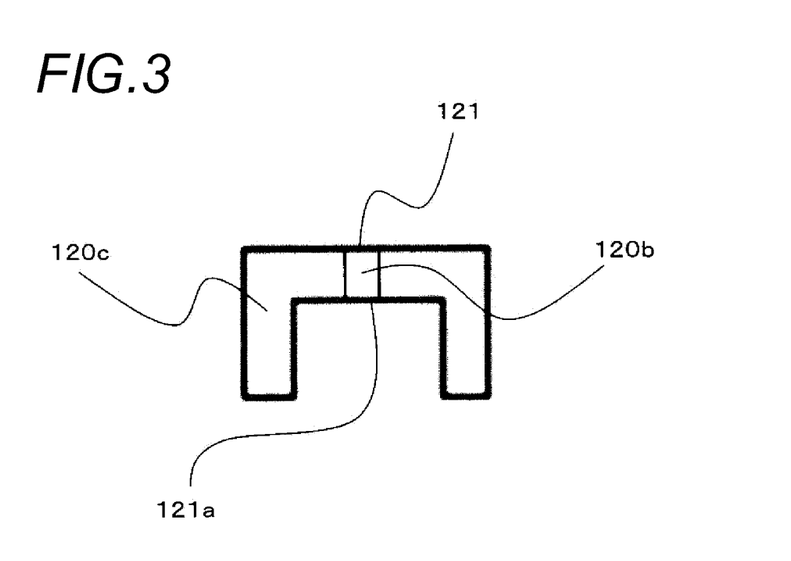
FIG. 3 is a sectional view of a switch operation portion shown in FIG. 1.
Figure 4:
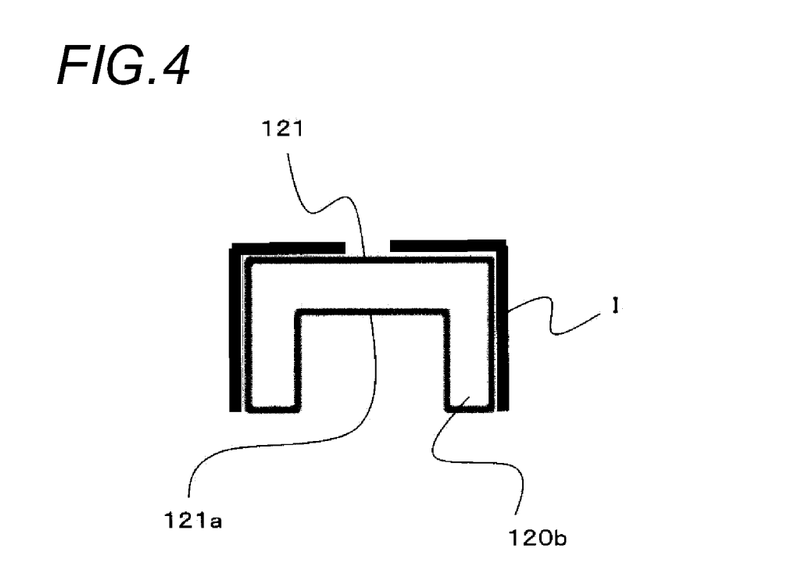
FIG. 4 is a sectional view of a switch operation portion of a modified example shown in FIG. 1.

FIG. 3 is a sectional view of a switch operation portion 120 shown in FIG. 1. FIG. 4 is a sectional view of a switch operation portion 120 which is a variation of the switch operation portion 120 shown in FIG. 1.

The light emitting unit 1 according to the embodiment 1 of the present disclosure is incorporated into the switch unit 100 which constructs three switches of a power window which are provided in, for example, a vehicle.

The switch unit 100 has a switch function portion 110 and the light emitting unit 1.

First, the switch function portion 110 is described.

The switch function portion 110 is a portion which has a function of switching the power windows, and has three switch operation portions 120 which are arranged in a row, the downlight display portion 130 not shown in the figure, the three push switch portions 140 and the circuit board 150.

The switch operation portion 120 performs switching operations when an operator presses the switch operation portion 120. As shown in FIG. 1, the switch operation portion 120 has a box-like shape whose bottom surface is opened, and while the push switch portion 140 is arranged below, light from a light guiding member 20 to be described below in the box is transmitted.

In the switch operation portion 120, a display portion 121 is provided at an approximately central position of an operation surface 120a. In particular, as shown in FIG. 3, the switch operation portion 120 is formed by being two-color molded with optically transparent resin 120b and optically non-transparent resin 120c, and the display portion 121 is formed by the optically transparent resin 120b.

Therefore, when light is irradiated in the box of the switch operation portion 120, that is, towards the back surface 121a of the display portion 121, the display portion 121 is emitted light.

Although it is exemplified that the display portion 121 is formed when the switch operation portion 120 is two-color molded with optically transparent resin 120b and optically non-transparent resin 120c, the present disclosure is not limited to this. As shown in FIG. 4, it is also possible that the switch operation portion 120 is formed of optically transparent resin and the outer surface except the display portion 121 is painted with optically non-transparent paint I.

Since the downlight display portion 130 not shown in the figure, like the display portion 121 of the switch operation portion 120, emits light when light is irradiated towards the back surface of the display portion 130, the detailed description of the display portion 130 is omitted. The downlight from an indoor light arranged on the indoor ceiling of a vehicle lights up a shift knob, a cup holder or the like.

The push switch portions 140 are provided on the circuit board 150, and switch ON/OFF operations of the power window when movable contacts (not shown in the figure) which are provided inside are pressed to contact with or separate from fixed contacts (not shown in the figure) which are formed on the circuit board 150.

The circuit board 150 is the so-called printed wiring board on which a switching circuit of the power window, a power source circuit of a light source 10, or the like are formed.

Then, the light emitting unit 1 is described.

The light emitting unit 1 makes the display portions 121 of the three switch operation portions 120 and the downlight display portion 130 emit light.

This light emitting unit 1 has a light source 10 and a light guiding member 20.

The light source 10 is realized, for example, by an LED (light emitting diode), and the surface of the box-shaped package becomes a light emitting surface 10a through which light is transmitted. In the light source 10, power source input terminals not shown in the figure are connected to the power source circuit of the circuit board not shown in the figure. The light source 10 is not limited to the LED, but other lighting members may be used.

The light guiding member 20 is made of optically transparent resin such as acrylic resin, and guides light emitted from the light source 10 to the display portions 121, 130 to make the display portions 121 of the switch operation portions 120 and the downlight display portion 130 emit light.

The light guiding member 20, which is arranged to face the light emitting surface 10a of the light source 10, has a columnar light incident guiding portion 30 at an end 30b of which a light incident surface 30a, which is an end surface on which light emitted from the light source 10 is incident, is formed, and four branched extending light guiding portions 40 which are branched from the light incident guiding portion 30, and which extend towards the back surfaces 121a of the three display portions 121 and the back surface of the downlight display portion 130.

Such a light guiding member 20 makes the display portions 121 of the switch operation portions 120 and the downlight display portion 130 emit light by making light incident from the light incident surface 30a to be transmitted from end surfaces 40a of the four branched extending light guiding portions 40.

The light incident guiding portion 30 is provided with a branched portion 31, which is branched into the four branched extending light guiding portions 40, at the side of the other end 30c opposite to the end 30b where the light incident surface 30a is formed. That is, the light guiding member 20 is provided to gather the branched places in one place.

When the size of the light incident surface 30a is set nearly equal to the size of the light emitting surface 10a, or slightly larger than that of the light emitting surface 10a, light emitted from the light source 10 is efficiently incident.

The four branched extending light guiding portions 40 have a cylindrical shape whose cross section perpendicular to the extending direction is fixed and round. The four branched extending light guiding portions 40 are so formed that, when the lengths in the extending directions of the branched extending light guiding portions 40 are compared relatively, the end surfaces 40a of those which are longer have relatively larger areas.

The lengths in the extending directions of the branched extending light guiding portions 40 become the lengths of the branched extending light guiding portions 40 from the branched portion 31 to the extension ends.

In particular, in the embodiment 1, the four branched extending light guiding portions 40 are divided into two long branched extending light guiding portions 41 whose lengths from the branched portion 31 to the extension ends are relatively long, and two short branched extending light guiding portions 42 whose lengths from the branched portion 31 to the extension ends are shorter than the two long branched extending light guiding portions 41.

Therefore, the end surfaces 40a of the two long branched extending light guiding portions 41 are formed to have a larger area than that of the end surfaces 40a of the two short branched extending light guiding portions 42.

Figure 5:
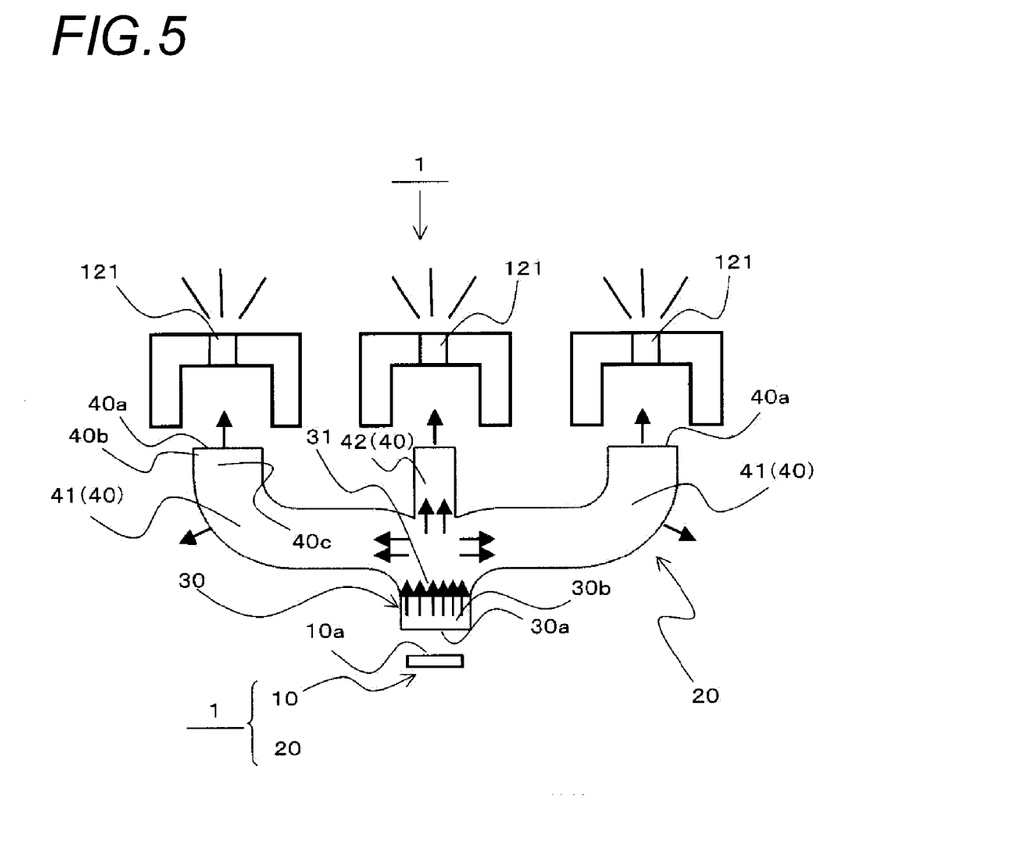
FIG. 5 is a figure which describes light paths through which light incident on a light guiding member is transmitted towards display portions and light amounts at respective positions.

Then, light paths through which light incident on the light guiding member 20 is transmitted towards the display portions 121 and 130 and light amounts at respective positions will be described by using FIG. 5. FIG. 5 is a figure which describes light paths through which light incident on the light guiding member 20 is transmitted towards the display portions and light amounts at respective positions.

The arrows shown in FIG. 5 show the advancing directions of light and the number of the arrows shows the sizes of the light amounts.

The light incident on the light guiding member 20 is reflected and advances in the light guiding member 20, but FIG. 5 is shown in a simplified way.

In FIG. 5, the description of the light which is guided by the downlight display portion 130 is omitted.

Light which is emitted from the light source 10 is incident on the light incident surface 30a of the light incident guiding portion 30. The light which is incident arrives at the branched portion 31 while being reflected in the light incident guiding portion 30a.

The light which arrives at the branched portion 31 is branched into the long branched extending light guiding portions 41 and the short branched extending light guiding portion 42 and advances. The amounts of the lights which advance in the long branched extending light guiding portions 41 and the short branched extending light guiding portion 42 are in accordance with the sizes of the cross-sectional areas of the long branched extending light guiding portions 41 and the short branched extending light guiding portion 42 respectively. That is, the amounts of the lights that advance in the long branched extending light guiding portions 41, whose cross-sectional areas are larger, are more than the amount of the light that advances in the short branched extending light guiding portion 42.

The lights which advance in the long branched extending light guiding portions 41 and the short branched extending light guiding portion 42 and arrive at the end surfaces 40a are emitted towards the back surfaces 121a of the display portions 120 and 130 from the end surfaces 40a.

Because the long branched extending light guiding portions 41 are longer than the short branched extending light guiding portion 42, the attenuation amounts of the lights which advance in the long branched extending light guiding portions 41 are larger than that of the light which advances in the short branched extending light guiding portion 42. Therefore, the difference between the amounts of the lights in the branched portion 31 is offset, and lights of equal amounts are emitted respectively from the end surfaces 40a of the long branched extending light guiding portions 41 and the short branched extending light guiding portion 42.

In the light emitting unit 1 according to the embodiment 1 of the present disclosure, light emitted from one light source 10 is guided to the four display portions 121 and 130 by the light guiding member 20, and in consideration of the difference between the attenuation amounts of the lights produced due to the lengths in the extending direction of the four branched extending light guiding portions 40, the areas of the end surfaces 40a are set so that the same amounts of lights are emitted from the end surfaces 40a of the branched extending light guiding portions 40. Thereby, while the number of the light sources 10 is reduced, the four display portions 121 and 130 can be made to emit light with uniform brightness.

Because the outer peripheral surface 40c of the extension end 40b of the branched extending light guiding portion 40 is perpendicular to the end surface 40a in the light emitting unit 1 according to the embodiment 1 of the present disclosure, the light transmitted from the outer peripheral surface 40c of the extension end 40b can be prevented from affecting the brightness of the display portions 121 and 130.

Because the plurality of branched extending light guiding portions in the light emitting unit 1 according to the embodiment 1 of the present disclosure are cylindrical, and the outer surfaces are axially symmetric, the connection arrangement of the branched extending light guiding portions at the branched portion is highly flexible. As a result, the plurality of branched extending light guiding portions can be easily branched at the branched portion.

Embodiment 2

Figure 6:
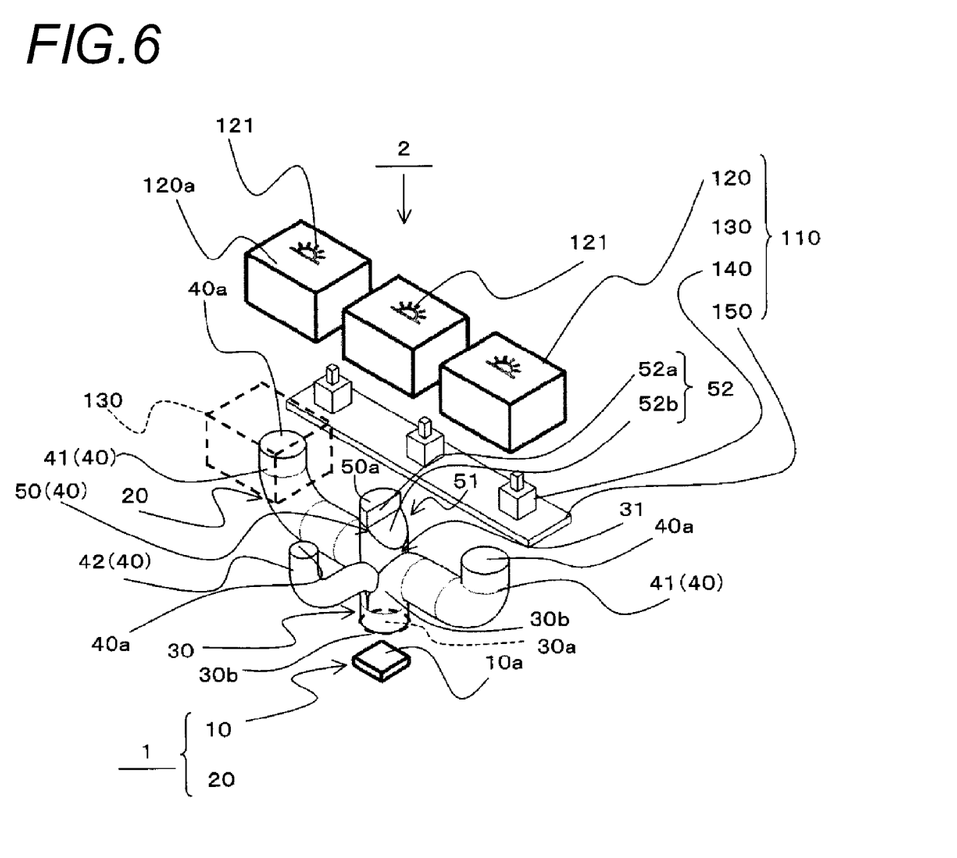
FIG. 6 is an exploded perspective view of a switch unit in which a light emitting unit according to an embodiment 2 of the present disclosure is incorporated.
Figure 7:
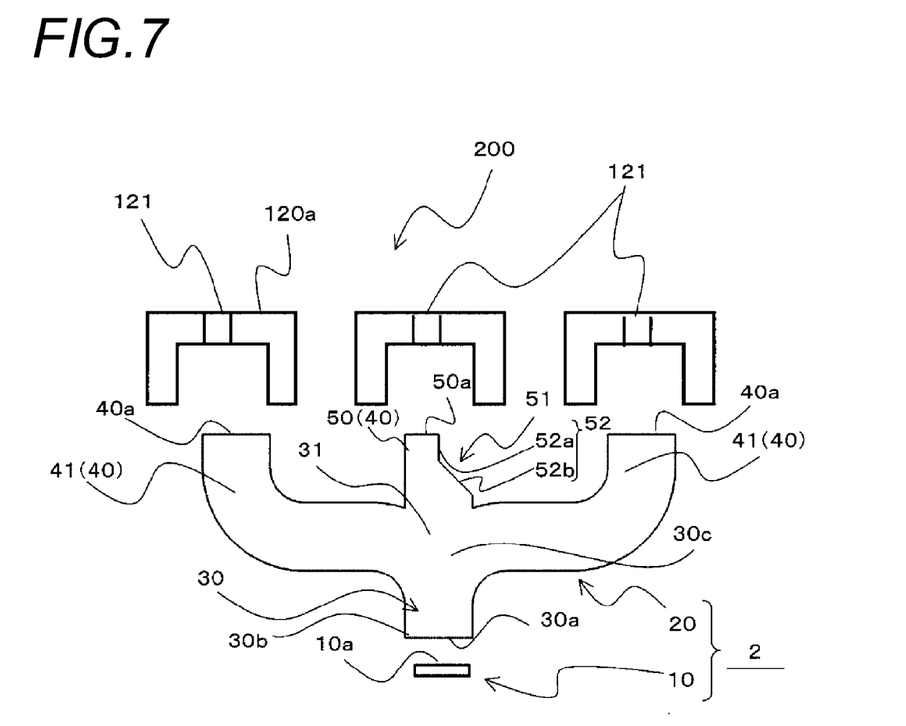
FIG. 7 is a sectional view of the switch unit shown in FIG. 6.

Then, a light emitting unit 2 according to the embodiment 2 of the present disclosure is described by using FIGS. 6 to 7. FIG. 6 is an exploded perspective view of a switch unit 200 in which the light emitting unit 2 according to the embodiment 2 of the present disclosure is incorporated. In FIG. 6, a downlight display portion 130 is shown with dashed lines so that parts which interfere with the downlight display portion 130 are seen.

FIG. 7 is a sectional view of the switch unit 200 shown in FIG. 6. In FIG. 7, push switch portions 140 and a circuit board 150 are not shown.

The light emitting unit 2 according to the embodiment 2 of the present disclosure, like the light emitting unit 1 of the embodiment 1, is incorporated into the switch unit 200 which constructs three switches of a power window which are provided in a vehicle.

The light emitting unit 2 of the embodiment 2 differs from the light emitting unit 1 of the embodiment 1 in that in two short branched extending light guiding portions 42 and 50, the section except an extension end 51 perpendicular to the extending direction of the short branched extending light guiding portion 50, which extends towards the back surface 121a of the display portion 121 of the switch operation portion 120, is formed to be equal to the sections perpendicular to the extending direction of the long branched extending light guiding portions 41.

In addition, other components are the same as those of the embodiment 1, and the same symbols as those of the same components of the embodiment 1 are given.

In the short branched extending light guiding portion 50 of the light emitting unit 2, a part of the extension end 51 is cut off from the side of an end surface 50a. Thereby, the area of the end surface 50a is formed to be smaller than the area of the end surfaces 40a of the long branched extending light guiding portions 41.

A cut-off section 52 which is formed by cutting off a part of the extension end 51 is directed towards directions different from that of the end surface 50a.

In particular, the cut-off section 52 is formed by a perpendicular cut surface 52a which is cut perpendicular to the end surface 50a and an inclined cut surface 52b which is cut in an inclined, outward radial direction from the cut end of the perpendicular cut surface 52a.

With such a cut-off section 52, light is emitted from the cut-off section 52 towards a direction different from the back surfaces 121a of the display portions 121. Therefore, the light emitted from the cut-off section 52 will not affect the brightness of the display portions 121.

Figure 8:
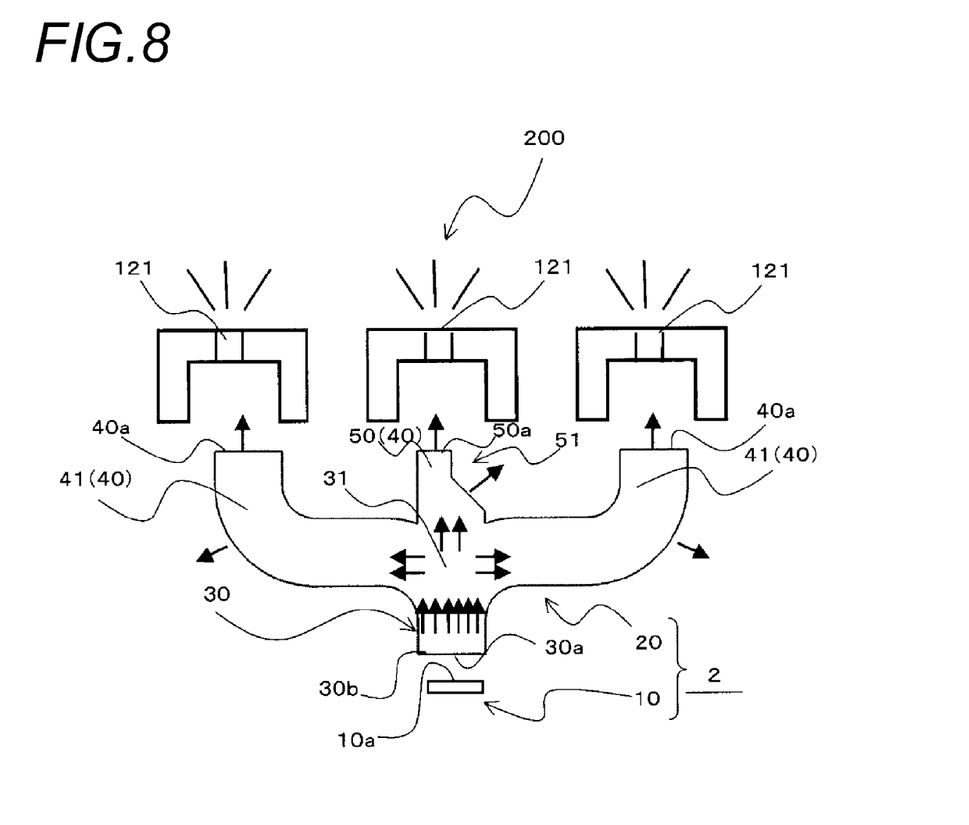
FIG. 8 is a figure which describes light paths through which light incident on a light guiding member is transmitted towards display portions and light amounts at respective positions.

Then, light paths through which lights incident on the long and short branched extending light guiding portions 41, 50 are transmitted towards the display portions 121 and light amounts at respective positions will be described by using FIG. 8. FIG. 8 is a figure which describes light paths through which lights incident on the long and short branched extending light guiding portions 41, 50 are transmitted towards the display portions 121 and light amounts at respective positions.

The arrows shown in FIG. 8 show the advancing directions of light and the number of the arrows shows the sizes of the light amounts. The lights incident on the long and short branched extending light guiding portions 41, 50 are reflected and advance in the long and short branched extending light guiding portions 41, 50, but FIG. 8 is shown in a simplified way.

In FIG. 8, the description of the light which is guided by the downlight display portion 130 is omitted.

Light which is emitted from the light source 10 is incident on the light incident surface 30a of the light incident guiding portion 30. The light which is incident arrives at the branched portion 31 while being reflected in the light incident guiding portion 30.

The light which arrives at the branched portion 31 is branched into the long branched extending light guiding portions 41 and the short branched extending light guiding portion 50 and advances. The amounts of the lights which advance in the long branched extending light guiding portions 41 and the short branched extending light guiding portion 50 are in accordance with the sizes of the cross-sectional areas of the long branched extending light guiding portions 41 and the short branched extending light guiding portion 50 respectively. That is, because the cross-sectional area of the long branched extending light guiding portions 41 and the short branched extending light guiding portion 50 are equal, the same amounts of lights advance in the long branched extending light guiding portions 41 and in the short branched extending light guiding portion 50, respectively.

The lights which advance in the long branched extending light guiding portions 41 and the short branched extending light guiding portion 50 and arrive at the end surfaces 40a and 50a are emitted towards the back surfaces 121a of the display portions 120 and 130 from the end surfaces 40a and 50a. Because the long branched extending light guiding portions 41 are longer than the short branched extending light guiding portion 50, the attenuation amounts of the lights which advance in the long branched extending light guiding portions 41 are larger than that of the light which advances in the short branched extending light guiding portion 50. However, because the end surface 50a of the short branched extending light guiding portion 50 is smaller than the end surfaces 40a of the long branched extending light guiding portions 41, the same amounts of lights are emitted from the end surfaces 40a and 50a of the long branched extending light guiding portions 41 and the short branched extending light guiding portion 50, respectively.

The light emitting unit 2 according to the embodiment 2 achieves the same effects as the light emitting unit 1 of the embodiment 1, and the size of the end surface 50a can be easily reduced by cutting the extension end 51 of the short branched extending light guiding portion 50.

Figure 9:
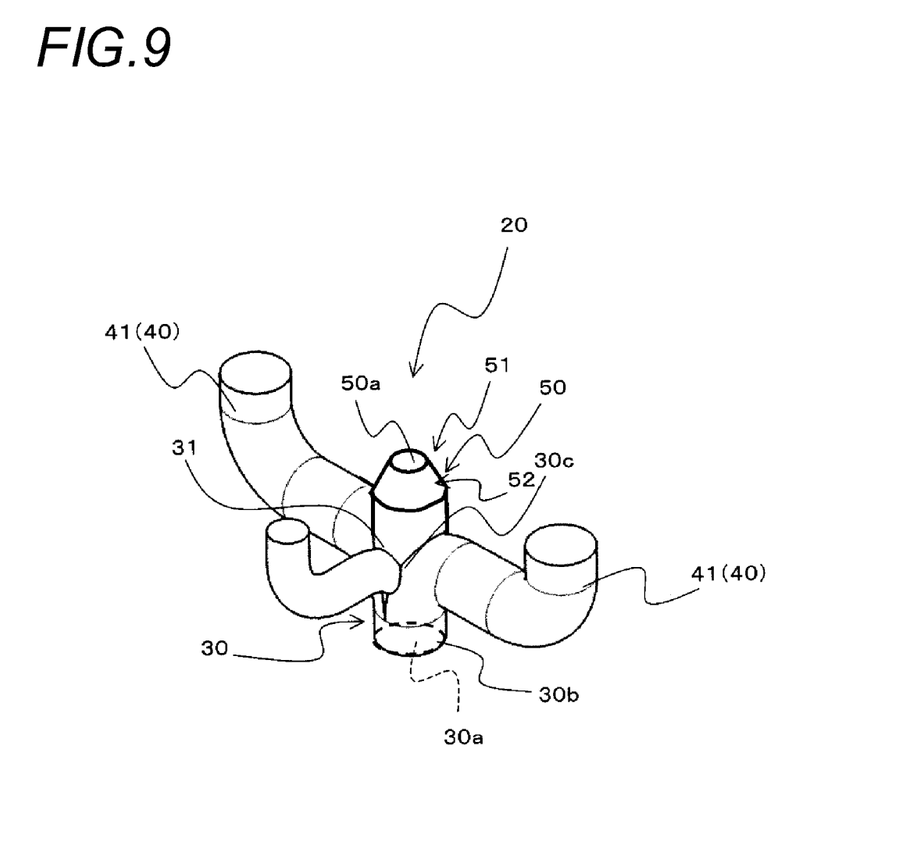
FIG. 9 is a figure which shows a light guiding member of a variation of the embodiment 2.

It is exemplified in the light emitting unit 2 according to the embodiment 2 of the present disclosure that the cut-off section 52 is formed by the perpendicular cut surface 52a and the inclined cut surface 52b, but the present disclosure is not limited to this. Other shapes are also possible as long as the cut-off section 52 from which the light is emitted towards a direction different from the back surfaces 121a of the display portions 121 is formed. For example, as shown in FIG. 9, the cut-off section 52 may be formed into a cone shape.

It is exemplified in the light emitting units 1 and 2 according to the embodiments 1 and 2 of the present disclosure that the light guiding member 20 is branched into the four branched extending light guiding portions 40 from the branched portion 31, but the number of branched extending light guiding portions 40 branched from the branched portion 31 is not limited to this. That is, the number may be set according to the number of the display portions to which light is guided.

It is exemplified in the light emitting units 1 and 2 according to the embodiments 1 and 2 of the present disclosure that the light guiding member 20 makes the three display portions 121 of the power window and the downlight display portion 130 emit light, but the present disclosure is not limited to this. Other display portions can also be made to emit light.

It is exemplified in the light emitting units 1 and 2 according to the embodiments 1 and 2 of the present disclosure that the branched extending light guiding portions 40 are cylindrical, but the shape of the branched extending light guiding portions 40 is not limited to this. For example, the branched extending light guiding portions 40 may be formed into a prismatic shape.

The invention accomplished by the inventor is described in detail based on the above embodiments of the invention, but the present disclosure is not limited to the above embodiments of the invention and can be modified in various ways without departing from the spirit of the invention.

By the above invention, a light emitting unit that can make a plurality of display portions emit light with uniform brightness while the number of light sources is reduced can be obtained.

What is claimed is:

1. A light emitting unit comprising:
   a light source; and
   a light guiding member including:
   a light incident guiding portion that is arranged to face a light emitting surface of the light source and have a light incident surface, on which light emitted from the light source is incident, is formed at one end thereof; and
   a plurality of branched extending light guiding portions that are branched from the light incident guiding portion and extend towards back surfaces of a plurality of display portions,
   wherein the light guiding member makes the display portions emit light when light incident from the light incident guiding portion is transmitted from end surfaces of the plurality of branched extending light guiding portions;
   wherein a branched portion, which is branched into the plurality of branched extending light guiding portions, is provided at the other end of the light incident guiding portion which is opposite to the one end;
   wherein the plurality of branched extending light guiding portions are so formed that, the end surfaces of the branched extending light guiding portions have larger areas in accordance with increase of the lengths in the extending directions of the branched extending light guiding portions;
   wherein the end surfaces of the plurality of branched extending light guiding portions emits light having equal amount to each other; and
   wherein the lengths in the extending directions of the branched extending light guiding portions are relatively different.

2. The light emitting unit according to claim 1, wherein sections of the branched extending light guiding portions of the light guiding member perpendicular to the extending direction thereof are uniform in size from the branched portion to the end surfaces respectively.

3. The light emitting unit according to claim 1, wherein a section except the extension end perpendicular to the extending direction of a first branched extending light guiding portion is formed to be equal to a section perpendicular to the extending direction of a second branched extending light guiding portion which is longer than the first branched extending light guiding portion, and a part of the extension end of the first branched extending light guiding portion is cut off from a side of the extension end so that the area of the end surface is reduced.

4. The light emitting unit according to claim 1, wherein the plurality of branched extending light guiding portions have cylindrical shapes respectively.

* * * * *